Dec. 31, 1957 P. C. BOOTY, JR 2,818,190
LABEL APPLYING MACHINE
Filed March 16, 1955 3 Sheets-Sheet 2

INVENTOR.
Philip C. Booty, Jr.
BY Paul O. Pippel
Atty.

Dec. 31, 1957 P. C. BOOTY, JR 2,818,190
LABEL APPLYING MACHINE
Filed March 16, 1955 3 Sheets-Sheet 3

INVENTOR.
Philip C. Booty, Jr.
BY Paul O. Pippel
Atty.

United States Patent Office

2,818,190
Patented Dec. 31, 1957

2,818,190

LABEL APPLYING MACHINE

Philip C. Booty, Jr., Chicago, Ill., assignor to International Harvester Company, a corporation of New Jersey Application March 16, 1955, Serial No. 494,658

2 Claims. (Cl. 216—25)

This invention relates to a new and improved label-applying machine.

Many small manufactured products must be packaged to facilitate distribution and sale thereof. Oftentimes various items of manufacture are put in packages of the same size and shape. Thus, in order to coordinate manufacture and packaging, the application of identifying indicia to the package denoting what items are within the package is postponed until after production and the products are ready to be packaged. This of course eliminates the possibility of one package being in more abundant supply than another such as might occur if the packages were to be preliminarily identified as to certain products. Obviously there are many ways to mark packages and the present invention relates to one such means.

A principal object of the present invention is to provide a machine for applying a gummed label to the cylindrical surface of a can or carton or the like.

An important object of this invention is to provide means for cutting out portions of a continuous tape and applying that cut out portion of tape to the external surface of a cylindrical can or the like.

Another and further important object and advantage of this invention lies in the provision of means for advancing a continuous tape a predetermined distance across the label-applying machine of this invention whereupon the machine is energized and a particular portion of the continuous tape is cut out and applied by the machine to the external surface of a cylindrical package.

A still further important object of this invention is to supply a label-applying machine with a continuous tape whereupon the tape subsequently to having portions thereof cut out as labels and applied to surfaces may have the remainder of the tape continuously drawn through the machine and wound up on a spool at a discharge end thereof.

Another and further important object of this invention is to provide a label-applying machine for cylindrical cans or the like wherein when a can is manually inserted into the machine it completes an electrical circuit to energize the machine and cause a combined shear and applicator member to cut through a continuous strip of labels causing a removal of a single label and an immediate and successive application of the removed label to the outer cylinderical surface of the can which initially energized the machine.

A further important object of this invention is to supply a photoelectric cell in the system to insure registration of the label portion of the tape with the label cut-out mechanism.

Other and further important objects and advantages will become apparent from the disclosure in the following specification and accompanying drawings.

In the drawings:

Figure 4 is a wiring diagram showing the electrical apparatus of the device of this invention;

As shown in the drawings:

Figure 2:
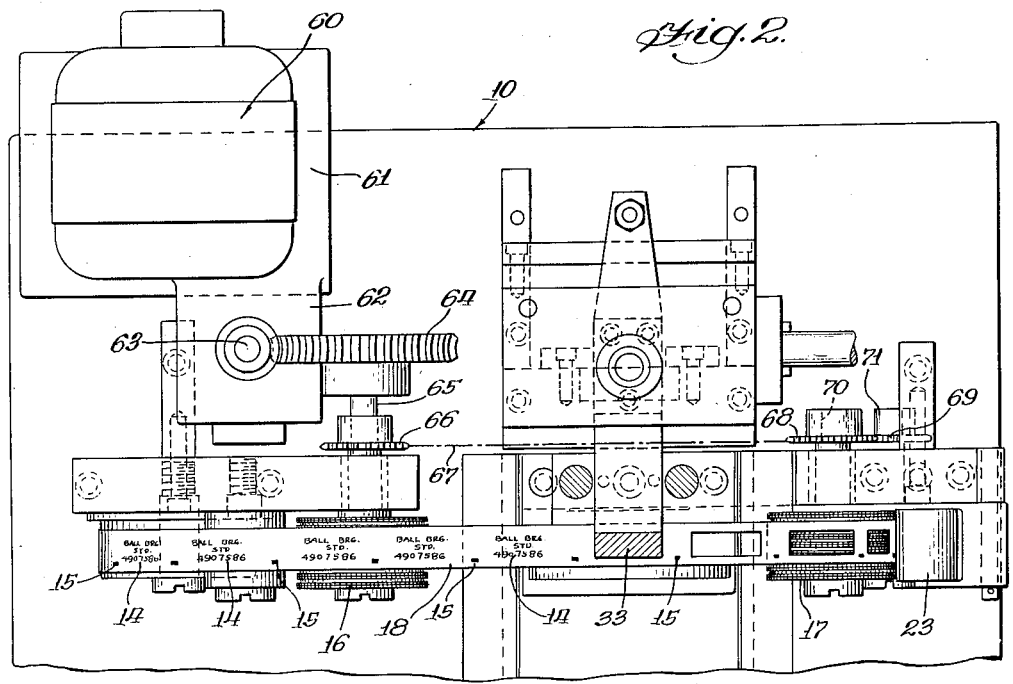
Figure 2 is a sectional view of the label-applying machine as taken on the line 2—2 of Figure 1.
Figure 11:
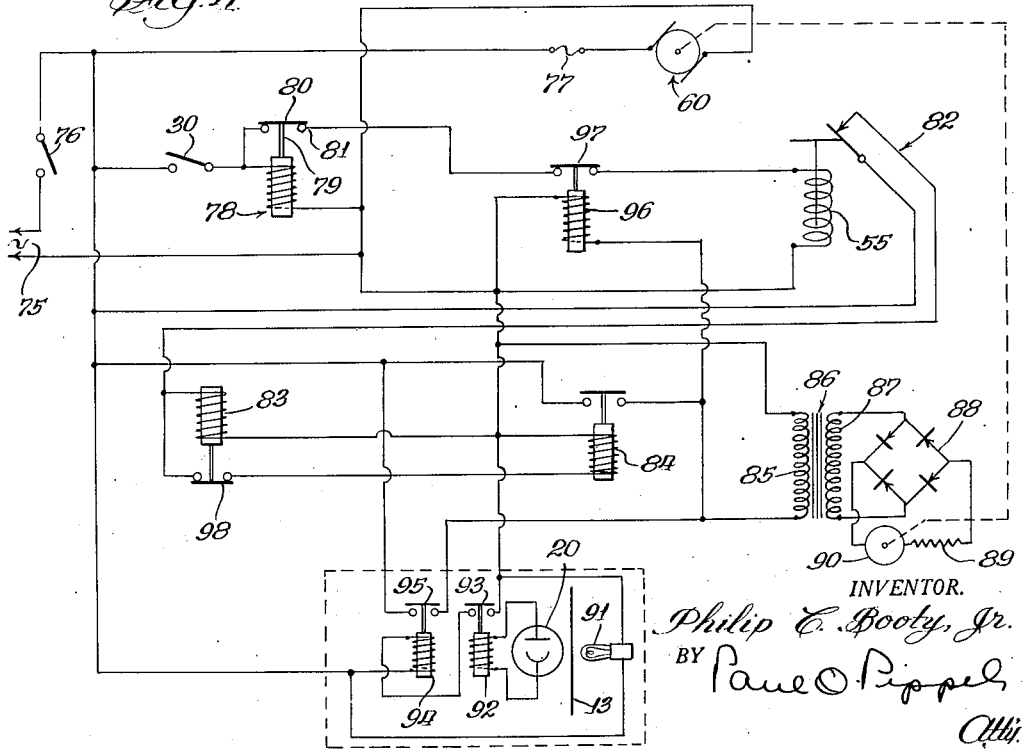

The reference numeral 10 indicates generally a supporting structure about and on which the label-carrying machine of this invention is carried. A first spindle 11 is fixedly mounted on the supporting structure 10 and is adapted to carry a roll 12 of imprinted gummed tape 13 of the pressure sensitive adhesive type. A plan view of the tape 13 is best shown in Figure 2 in which there is included a showing of a portion of the tape and the imprinted matter thereon as indicated at 14. The imprinted portion 14 repeats at regular intervals throughout the length of the tape. The function of the device of this invention is to cut out the imprinted portion 14 of the tape 13 and apply that portion as a label to the outer surface of a can or a package of the like. In addition to the printed indicia on the continuous gummed tape 13 there is also provided a light responsive spot 15 adjacent each of the spaced-apart printed indicias on the tape. The light responsive spots 15 are for the purpose of actuating a photo-electric cell as will hereinafter be described for the purpose of registering the tape into indicia centered position beneath the shearing mechanism at the time of each successive operation of the machine.

From the supply roll or spool 12 the tape 13 is adapted to pass upwardly and laterally over a guide roll 16. A small idler roller 16a is journally mounted on the frame structure 10 intermediate the supply roll 13 and the guide roll 16. A spaced-apart guide roll 17 acts in conjunction with the guide roll 16 to provide a relatively flat or horizontal run 18 of the tape 13. The tape is generally designated by the numeral 13 and it should be understood that only that portion of the tape lying between the guide rolls 16 and 17 is further identified by the numeral 18. The machine includes a label shearing mechanism 19, a photoelectric cell 20 and a tape driving take-up spool 21. Still further the machine has an auxiliary tape feeding roll 22 and a guide or hold down roller 23.

The photo-electric cell 20 is adapted to be actuated by the light shielding spots 15 and when the cycle of the label-applying machine is completed the tape is automatically moved forwardly and wound up on the spool 21. The degree of movement of the tape 13 is thus controlled by the positions of the light opaque spots 15 thus insuring the proper centering of the printed indicia 14 beneath the shear mechanism at the time of cutting and applying the labels. This of course eliminates the possibility of error in indicia centering that would occur if the take-up spool were to be driven through fixed increments.

Figure 5:
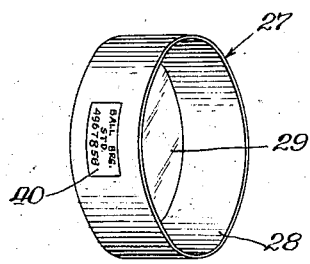
Figure 5 is a perspective view of a can of the type having the labels of this invention applied thereto.

As stated in the objects above it is an important phase of this invention to apply the sheared labels to an arcuate surface of a package such as the outer cylindrical wall of a can or the like. Directly beneath the label shearing mechanism is located a package-mounting carrier 24. The carrier 24 in the present instance includes a back wall 25 and an arcuate segment 26 over which a can or the like 27 as shown in Figure 5 may be positioned. The can 27 includes an upwardly projecting cylindrical body 28 and a closed bottom 29. The operator of the machine of this invention picks up a can 27 to receive a label and inserts the open top end of the can over the arcuate segment 26 so that the top circumferential edge of the can 27 lies against the back wall 25 of the package carrier 24.

Figure 1:
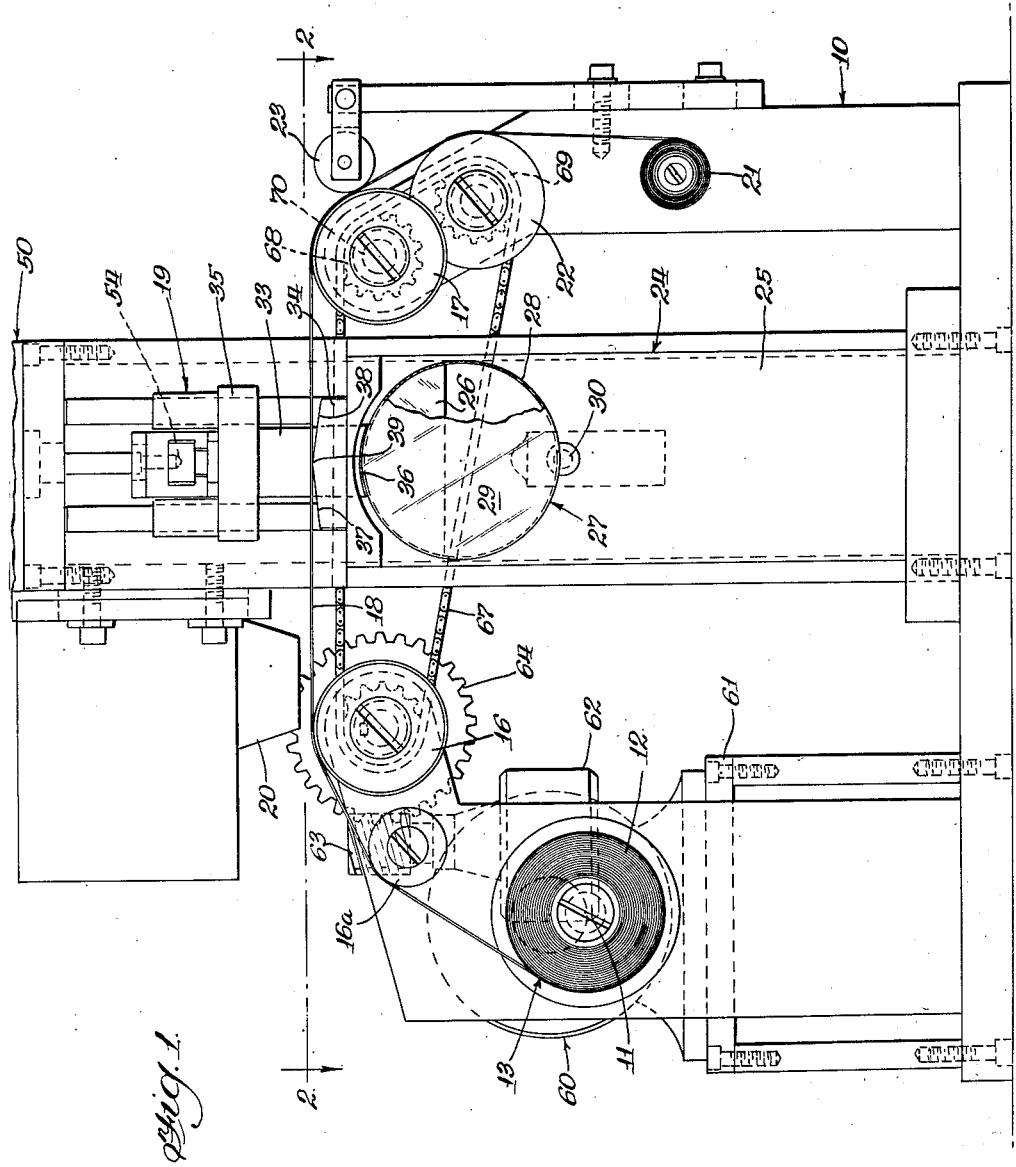
Figure 1 is a front elevational view of the label-applying machine of this invention.

The back wall 25 of the package carrier 24 is equipped with a spring extended contact 30 as best shown in Figures 1 and 4. More particularly as shown in Figure 4 the contact 30 has a rearwardly projecting shaft 31 which is urged forwardly at its rearward end by a spring 32 so that the contact 30 is spaced forwardly from the surface of the back wall 25 of the package carrier 24. The contact 30 is part of an electrical switch and when it is actuated by the operator inserting a can 27 into the can holder the hydraulically operable shearing mechanism 19 is placed in operation causing a cutting out of the printed indicia 14 of the tape 13 and an impressing of that gummed label onto the cylindrical surface of the can 27.

The shearing mechanism of this invention includes a vertically reciprocating shear 33 which cooperates with a stationary label die 34. The reciprocating shear 33 is slidably mounted for vertical movement within a supporting column 35 forming a part of the supporting structure 10. The lower end of the reciprocating shear 33 is arcuate or concave in its shape as shown at 36 and is adapted to conform to the arcuate surface of the outer circumference of the can 27. Similarly, the arcuate surface of the can holding segment 26 corresponds to the arcuate surfaces of the can and the under surface of the reciprocating shear. This of course makes for a solid base against which the shear 33 with its concave bottom 36 may impress a freshly severed label onto the cylindrical wall of the can 27.

Figure 3:
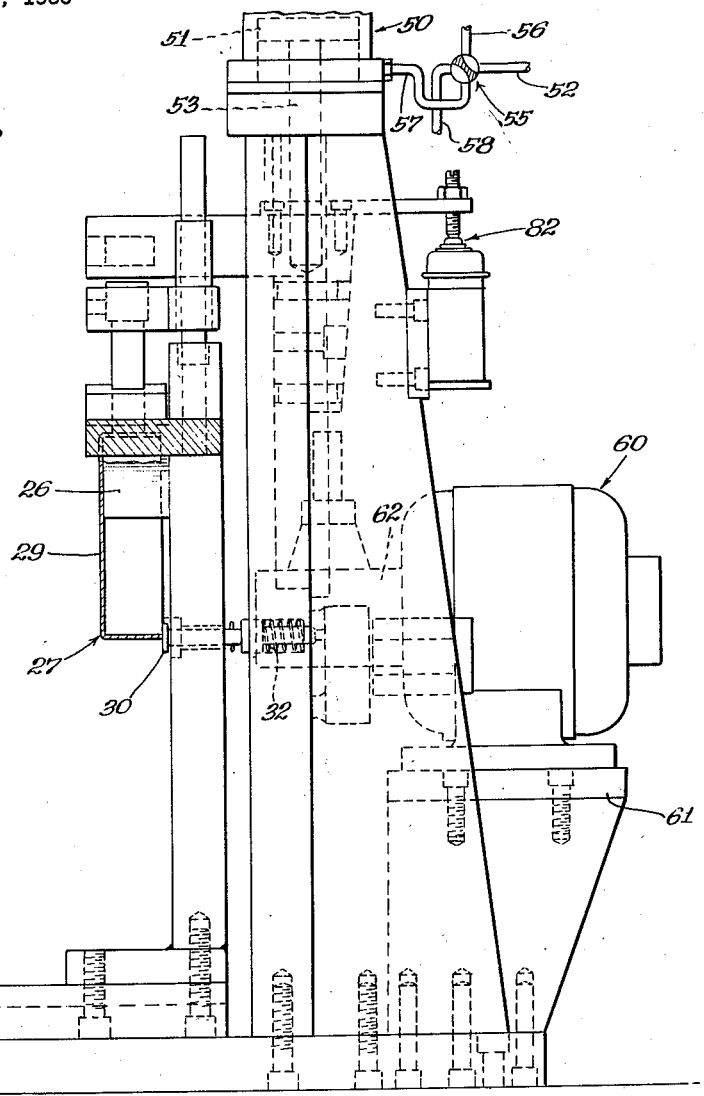
Figure 3 is a side elevational view partially in section of the machine as shown in Figure 1 and Figure 2.

The vertically reciprocating shear 33 is caused to be moved by operation of a hydraulic cylinder and piston. As best shown in Figure 3 a hydraulic cylinder 50 is mounted on top of the frame structure 10 and a reciprocable piston 51 is shown internally of the cylinder 50. Fluid under pressure is admitted or withdrawn through a conduit 52 leading to the cylinder 50 whereby the piston 51 is either raised or lowered within the cylinder. A downwardly depending piston rod 53 is adapted to be joined at its lower end to the shear member 33. The attachment of the piston rod 53 to the shear 33 is shown in Figure 1 at 54. A valve 55 is positioned in the fluid conduit 52 and is adapted to join either the conduit 56 or the conduit 57 which lead to the top and bottom respectively of the hydraulic cylinder 50. The valve 55 is a solenoid valve, the operation of which will be later described with respect to the electrical system for the entire label applying machine. In the position of the valve as shown in Figure 3 fluid under pressure is permitted to pass from the conduit 52 to the conduit 56 and thence to the top of the cylinder 50 whereupon the piston 51 is urged downwardly. Simultaneously fluid within the bottom of the cylinder 50 is exhausted through the conduit 57 and thence through the valve 55 to an exhaust conduit 58.

The label die is fixedly mounted on the supporting structure 10 at a position beneath the column structure 35 within which the reciprocating shear moves. The die 34 has a top surface with inclined walls 37 and 38 joining at a line apex 39. It is this inclination of the top walls of the die 34 that permits the reciprocating shear 33 to effect a scissors-type cut of the gummed tape thereby preventing tearing or other mutilation of the tape in the cutting out of the printed indicia thereon and subsequently applying that portion of the tape to the outer surface of a can.

As best shown in Figure 2 the label applying machine of this invention is equipped with an electrical motor 60 mounted on the frame supporting structure 10 and as shown in Figure 3 more particularly is mounted on a stand-like support 61 forming a part of the frame supporting structure 10. The motor 60 imparts rotational drive to a gear reduction box 62 which delivers reduced speed rotational drive to a generally vertically disposed worm 63. A worm gear 64 is in engagement with the worm 63 and delivers drive to a shaft member 65 on which the worm gear 64 is mounted. A sprocket 66 is carried on the shaft 65 and by means of a chain or the like 67 drive from the motor is carried to the tape feeding rolls 17 and 22. Sprockets 68 and 69 are mounted on shafts 70 and 71 of the feed rollers 17 and 22 respectively.

Figure 4 shows an electrical diagram for the machine of this invention. A source of electromotive force of the alternating current type is shown at 75 and from this point the electrical energy is transmitted to all of the several electrically operated parts of this device. A control switch 76 is positioned in the power line and is arranged and constructed to permit or halt the passage of electrical energy to the circuit of this invention. When the switch 76 is closed the feed motor 60 is immediately put into operation. A fuse 77 is located in the circuitry just before the motor 60. In addition to immediately actuating the motor, the closing of the switch 76 prepares for actuation of the control circuits to be hereinafter described. When a can such as can 27 is inserted into the machine as disclosed in Figures 1 and 3 the electrical switch 30 is actuated and as shown in Figure 1 is closed. The switch 30 is a micro-switch which causes a chain reaction of all of the other electrical elements in such a manner that the label applying machine operates satisfactorily. Immediately following the micro-switch 30 in the circuit is a normally closed time delay relay 78. The relay has a core 79 which is adapted to be pulled inwardly toward the coil of the time delay relay 78. The upper end of the core 79 joins with a hinged link or the like 80 which constitutes a contact for the electrical circuit of this invention. A fixed contact 81 is adapted to engage the portion 80 of the time delay relay and thus passage of electrical current continues for a time through the circuit as shown in Figure 4. The time delay relay 78 is arranged and constructed to delay or postpone the time at which the electrical switch 80—81 is broken.

Simultaneously with the closing of the micro-switch 30 the solenoid valve 55 is energized causing the valve to shift to a position such as shown in Figure 3 wherein fluid under pressure is admitted to the top of the hydraulic cylinder 50 causing the cutter to be moved downwardly. A micro-switch 82 is associated with the solenoid valve 55 whereby after the valve is actuated the micro-switch 82, normally closed, is opened. The time delay relay 78 is arranged to hold the operation of the cutter just long enough to make its downward stroke cutting out the label from the continuous tape and applying the cut out label to the exterior of a can. At this point the delay mechanism in the relay reaches its end causing the electrical switch 80—81 to become disengaged whereupon the solenoid valve 55 de-energizes causing the fluid under pressure from line 52 to be admitted to the bottom of the hydraulic cylinder 50 causing the cutter to move upwardly away from the can and the tape. When the solenoid valve 55 is de-energized there is an automatic closing of the electrical switch 82. This closing of the switch 82 completes the passage of electrical energy to relays 83 and 84.

The relay 83 is of the time delay variety corresponding to the time delay relay 78. The relay 84 is merely a control relay and operates immediately. The energized relay 84 operates to close its contacts to energize the primary 85 of a transformer 86. The transformer secondary identified as 87 is then energized to cause electrical current to flow through a bridge rectifier 88. Thereafter rectified current flows through a resistor 89 and the field of a magnetic clutch 90. The magnetic clutch operates to connect the motor drive 60 to the feed rolls 17 and 22 which causes the tape to be pulled from the source of supply across the cutting mechanism and thence onto a takeup spool 21. As soon as the feed rolls 17 and 22 are actuated the tape is commenced to be moved across the bed portion of the machine. This of course moves the spot 15 from its position beneath the photoelectric cell 20 and the beam from a light source 91 is permitted to pass through the tape 13 and thereupon cause the photo-electric cell to generate a current to energize a relay 92 in association therewith. Relay 92 operates to close a switch 93 which in turn causes a relay 94 to be energized. The energizing of the relay 94 causes a closing of an electrical switch 95. At the same time as the relays 83 and 84 are energized so also is the control relay 96 energized insuring the disengagement of solenoid valve 55 by breaking the electrical switch 97 in the line between the time delay relay 78 and the solenoid valve 55.

The time delay relay 83 operates after the necessary delay of time to open contacts 98 to thus de-energize the control relay 84. At this point control relay 84 restores. The closed contacts of the relay 94 at 95 maintain the transformer 86 energized. When the next or succeeding opaque spot 15 on the tape 13 breaks the beam of light from the source 91 to the photo-electric cell 20 the current generated by the photo-electric cell stops whereupon the relay 92 permits the switch 93 to open. This means that control relay 92 is de-energized and restores. The contacts 93 of the relay 92 open to deenergize control relay 94. At this point relay 94 restores to open contacts 95.

The disengagement of the contact points 95 cause an opening of the transformer primary 85. The secondary 87 of the transformer 86 collapses to de-energize the field winding of the magnetic clutch 90. The magnetic clutch restores to disconnect the motor drive from the feed rolls 17 and 22.

The operator then draws the can out of the machine thus opening the micro switch 30 at which point the machine is ready to receive a new can for label application and a carrying through of all of the steps just described in connection with the electrical diagram of Figure 4. When a subsequent can to be label is put into the machine the micro switch 30 is closed whereupon the solenoid valve 55 operates causing micro-switch 82 to be opened to restore time relay relay 83.

In the operation of the device of this invention the user thereof takes an unlabeled can 27 and inserts it into the package holder over the arcuate segment 26 and against the electrical contact 30 whereupon the completing of the electrical circuit by the depression of the contact 30 causes the shear 33 to reciprocate in the column 35 whereupon the printed matter, in this instance "Ball Bearing St'd. 4907586" is cut out of the center portion of the tape and is pressed down onto the outer cylindrical surface of the can 27 by the bottom concave surfaces of the shear 33 so that the label apepars at 40 on the side of the can as shown in Figure 5. The one operation is then complete insofar as the label-applying mechanism is concerned. However, immediately upon completion of this phase of the cycle the photo-electric cell 20 actuates the take-up spool 21 and feeding roll 2 whereupon the tape 13 is drawn across the flat run 18 so that a new uncut label is positioned dierctly beneath the reciprocating shear 33 so that the machine is available for immediate successive operation. The tape 13 as best shown in Figure 3 has the label part 40 removed as shown at 41. This intermittently blanked out tape 13 continues its travel over the guide roll 17 between the hold-down feed roller 23, over the feed roll 22 and finally is wound up on the take-up spool 21. There is sufficient material in the tape adjacent both sides of the cut-out portion and also at the top and bottom of the cut-out portion to permit the tape to retain its flat shape and be pulled as a unit across the flat rim 18 and wind up on the take-up spool 21. The used tape wound on the spool 21 may then be discarded or used in any other manner desired.

Various details of construction may be changed throughout a wide range without departing from the principles disclosed herein and I therefore do not propose limiting the patent granted herein otherwise than as necessitated by the appended claims.

What is claimed is:

1. A label applying machine comprising a supporting structure, spindle means on one side of said supporting structure for receiving a roll of imprinted gummed tape of the pressure sensitive type, a label shearing mechanism on said supporting structure spaced from said spindle, said label shearing mechanism including a label die and a label shear, a spool on the other side of said supporting structure spaced from said label shearing mechanism, means driving said spool to move said imprinted gummed tape through said machine, means moving said label shear, means on said supporting structure to removably receive a package to be labeled, said means removably receiving a package comprising an arcuate ledge located beneath said label shear, and contact means positioned closely adjacent said supporting structure and the inner edge of said arcuate ledge, means joining said contact means with said means moving said label shear, whereby when an arcuate shaped package is inserted fully onto said arcuate ledge the contact means is engaged to cause movement of said label shear and a subsequent cutting out of the label from the imprinted gummed tape and an application of the cut-out label to the outer arcuate surface of the package.

2. A device as set forth in claim 1 in which the under surface of the label shear is arcuate in shape with the outer edges extending downwardly below the center thereof to conform to the arcuate shape of the package and ledge and to facilitate shearing.

References Cited in the file of this patent
UNITED STATES PATENTS

| | | |
|---|---|---|
| 1,199,810 | Mount | Oct. 3, 1916 |
| 1,986,611 | Thomsen | Jan. 1, 1935 |
| 2,157,556 | Menschner | May 9, 1939 |
| 2,482,711 | Jensen | Sept. 30, 1949 |
| 2,684,775 | Von Hofe | July 27, 1954 |